US012746857B2

(12) United States Patent
Min et al.

(10) Patent No.: US 12,746,857 B2
(45) Date of Patent: Sep. 29, 2026

(54) SEAT LOCKING RELEASE DEVICE

(71) Applicant: DAEWONSANUP CO., LTD., Ansan-si (KR)

(72) Inventors: Kyung Uk Min, Gunpo-si (KR); Myoung Yeon Kim, Ansan-si (KR); Jung Ho Hur, Anyang-si (KR)

(73) Assignee: DAEWONSANUP CO., LTD., Ansan-si (KR)

( * ) Notice: Subject to any disclaimer, the term of this patent is extended or adjusted under 35 U.S.C. 154(b) by 104 days.

(21) Appl. No.: 18/941,902

(22) Filed: Nov. 8, 2024

(65) Prior Publication Data

US 2025/0162473 A1 May 22, 2025

(30) Foreign Application Priority Data

Nov. 22, 2023 (KR) ........................ 10-2023-0163687

(51) Int. Cl.
*B60N 2/08* (2006.01)

(52) U.S. Cl.
CPC .................................. *B60N 2/0881* (2013.01)

(58) Field of Classification Search
CPC ........ B60N 2/0881; B60N 2/08; B60N 2/062; B60N 2/0735
See application file for complete search history.

(56) References Cited

U.S. PATENT DOCUMENTS

| | | | | |
|---|---|---|---|---|
| 7,802,490 B2 * | 9/2010 | Ingraham | B60N 2/3011 297/331 |
| 8,931,845 B2 | 1/2015 | Otsuka et al. | |
| 9,835,233 B2 | 12/2017 | Dunn et al. | |
| 2012/0132026 A1 * | 5/2012 | Ootsuka | B60N 2/12 74/471 R |
| 2013/0161991 A1 * | 6/2013 | Otsuka | B60N 2/12 297/344.21 |

FOREIGN PATENT DOCUMENTS

| | | | | |
|---|---|---|---|---|
| DE | 102023101169 A1 * | 12/2023 | B60N 2/02246 |
| EP | 3192696 A1 | 7/2017 | |
| EP | 2804799 B1 * | 11/2017 | A61G 5/14 |
| FR | 3083174 A1 * | 1/2020 | B60N 2/874 |
| JP | 2009073312 A * | 4/2009 | B60N 2/3065 |

(Continued)

OTHER PUBLICATIONS

Trans. DE-102023101169-A1 (Year: 2026).*

(Continued)

*Primary Examiner* — J. T. Newton

(74) *Attorney, Agent, or Firm* — Bridgeway IP Law Group, PLLC; Sang Ho Lee; Hyun Woo Shin

(57) ABSTRACT

Provided is a seat locking release device including a left-right slide cable that is connected to a left-right locking device for fixing or releasing a left-right movement of a seat to apply a releasing force to the left-right locking device, a forward-backward slide cable that is connected to a forward-backward locking device for fixing or releasing a forward-backward movement of the seat to apply a releasing force to the forward-backward locking device, and an integrated locking release device that simultaneously applies the releasing force to the left-right slide cable and the forward-backward slide cable.

9 Claims, 8 Drawing Sheets

(56) References Cited

FOREIGN PATENT DOCUMENTS

| | | | | | |
|---|---|---|---|---|---|
| JP | 5169101 | B2 * | 3/2013 | ........... | B60N 2/3065 |
| JP | 2013-129279 | A | 7/2013 | | |
| KR | 10-2021-0003621 | A | 1/2021 | | |
| WO | WO-2008024851 | A2 * | 2/2008 | ........... | B60N 2/0228 |

OTHER PUBLICATIONS

Trans. EP-2804799-B1 (Year: 2026).*
Trans. FR-3083174-A1 (Year: 2026).*
Trans. JP-2009073312-A (Year: 2026).*
Trans. JP-5169101-B2 (Year: 2026).*
Trans. WO-2008024851-A2 (Year: 2026).*

* cited by examiner

SEAT LOCKING RELEASE DEVICE

CROSS-REFERENCE TO RELATED APPLICATION(S)

This application is based on and claims priority of Korean Patent Application No. 10-2023-0163687, filed on Nov. 22, 2023, with the Korean Intellectual Property Office, the entire contents of which are hereby incorporated by reference.

BACKGROUND

1. Field of the Disclosure

The present disclosure relates to a seat locking release device, and more specifically to a seat locking release device capable of simultaneously releasing locking on a left-right slide and a forward-backward slide of a seat.

2. Description of the Related Art

In general, a seat that is installed in a vehicle may be installed on a forward-backward slide and a left-right slide to move a position in a forward-backward direction or a left-right direction. A forward-backward slide locking device and a left-right slide locking device are installed independently to fix the seat on the forward-backward slide and the left-right slide of the seat.

However, there was a problem that it was very inconvenient to perform a process of releasing the left-right slide locking device and then releasing the forward-backward slide locking device in order for a user to move the position of such seat to a desired position.

SUMMARY

The present disclosure is devised to solve various problems including the above problem and is directed to providing of a seat locking release device which may improve user convenience by simultaneously releasing the left-right slide locking device and the forward-backward slide locking device and may allow a worker or a user to easily adjust a stroke amount of a cable for the locking release. However, these problems are exemplary, and the scope of the present disclosure is not limited thereto.

According to an embodiment of the present disclosure, a seat locking release device is provided. The seat locking release device may include a left-right slide cable that is connected to a left-right locking device for fixing or releasing a left-right movement of a seat to apply a releasing force to the left-right locking device, a forward-backward slide cable that is connected to a forward-backward locking device for fixing or releasing a forward-backward movement of the seat and to apply a releasing force to the forward-backward locking device, and an integrated locking release device that simultaneously applies the releasing force to the left-right slide cable and the forward-backward slide cable.

According to an embodiment of the present disclosure, the seat locking release device may include a lever and a pulley to which the left-right slide cable and the forward-backward slide cable are connected, to rotate together with the lever.

According to an embodiment of the present disclosure, the pulley may include a first fixing groove portion formed to be spaced apart by a first radius based on a rotating axis of the pulley so that the forward-backward slide cable is connected to the pulley, and a second fixing groove portion formed to be spaced apart by a second radius based on the rotating axis of the pulley so that the left-right slide cable is connected to the pulley.

According to an embodiment of the present disclosure, the pulley may include a first guide portion that is bent in a shape having a curvature corresponding to the first radius so that the forward-backward slide cable may extend or stretch while maintaining the first radius according to a rotation of the pulley to support or guide the forward-backward slide cable, and a second guide portion that is bent in a shape having a curvature corresponding to the second radius so that the left-right slide cable may extend or stretch while maintaining the second radius according to the rotation of the pulley to support or guide the left-right slide cable.

According to an embodiment of the present disclosure, the first radius may be formed to be greater than the second radius.

According to an embodiment of the present disclosure, the integrated locking release device may include a stroke adjusting device for adjusting a rotation radius of the left-right slide cable or the forward-backward slide cable so as to adjust a stroke amount by the rotation of the pulley.

According to an embodiment of the present disclosure, the stroke adjusting device may be formed in a cam shape as a whole so as to be able to push out the left-right slide cable or the forward-backward slide cable.

According to an embodiment of the present disclosure, the integrated locking release device may further include a planetary gear combination installed between the pulley and the lever to increase a releasing force of the pulley by decelerating a rotation of the lever.

According to an embodiment of the present disclosure, the left-right locking device may include a front left-right locking device installed on a front left-right rail and a rear left-right locking device installed on a rear left-right rail, and the left-right slide cable may include a front left-right slide cable for applying a releasing force to the front left-right locking device, a rear left-right slide cable for applying a releasing force to the rear left-right locking device, a cable box for connecting the front left-right slide cable and the rear left-right slide cable, and an integrated left-right cable for applying a releasing force to the front left-right slide cable and the rear left-right slide cable simultaneously.

DETAILED DESCRIPTION OF THE EMBODIMENTS

Figure 1:
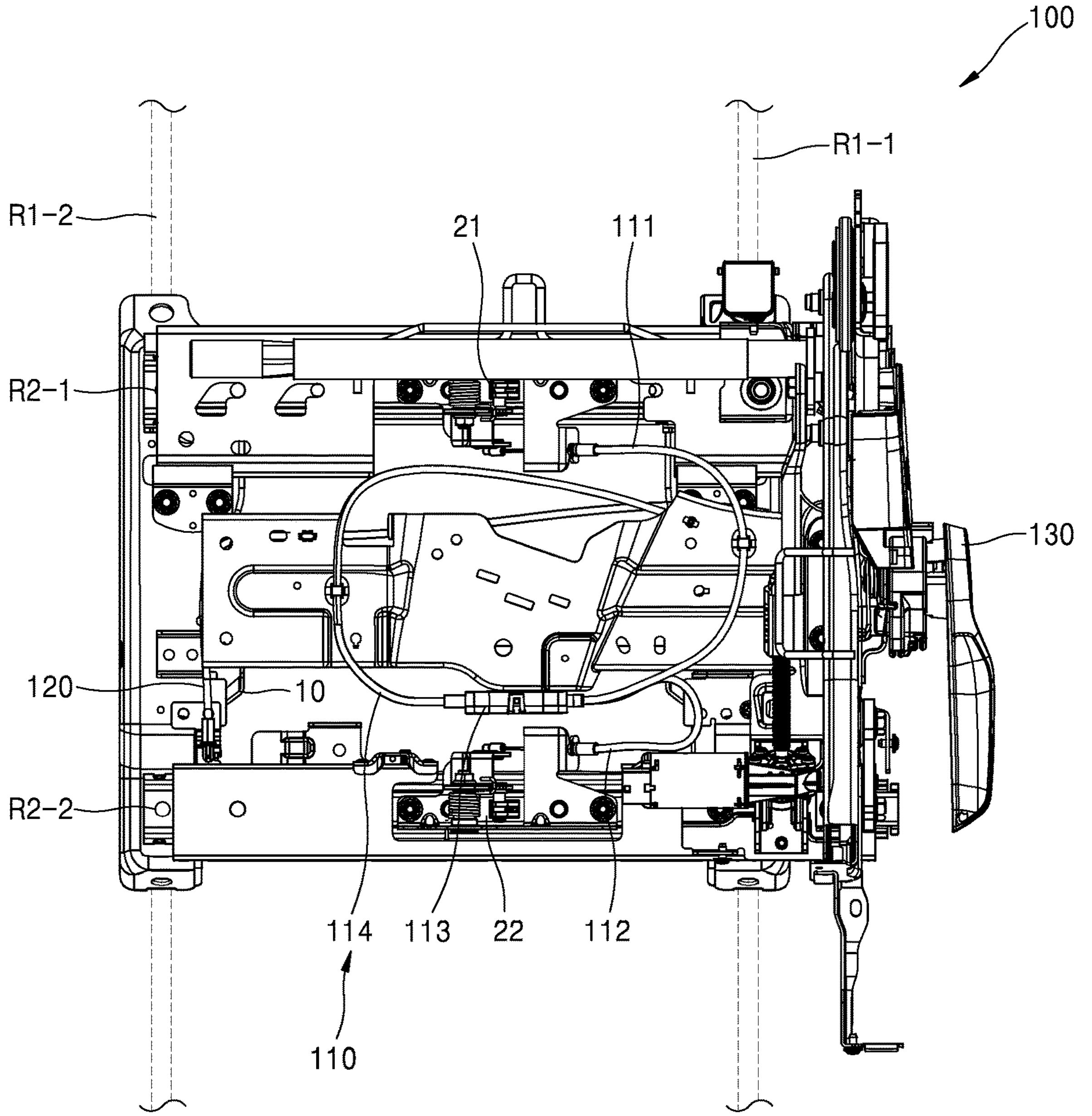
FIG. 1 is a plan view showing a seat locking release device according to an embodiment of the present disclosure when viewed from above.

Hereinafter, various preferred embodiments of the present disclosure will be described in detail with reference to the accompanying drawings.

Various embodiments of the present disclosure are provided to describe the present disclosure more thoroughly to those who have ordinary skill in the art, below embodiments may be modified in various different forms, and the scope of the present disclosure is not limited to the below embodiments. Rather, these embodiments of the present disclosure are provided to support and complete the present disclosure and to convey inventive concepts of the present disclosure more thoroughly to those skilled in the art. In addition, in the drawings, the thicknesses or sizes of layers are exaggerated for convenience of description and clarity.

Hereinafter, the embodiments of the present disclosure will be described with reference to drawings schematically showing the preferred embodiments of the present disclosure. For example, in the drawings, variations in the illustrated shape may be expected according to manufacturing technology and/or tolerance. Therefore, the embodiments of the present disclosure should not be construed as being limited to specific shapes of regions illustrated herein and should include, for example, a change in the shape due to a manufacturing process.

FIG. 1 is a plan view showing a seat locking release device 100 according to an embodiment of the present disclosure when viewed from above.

As shown in FIG. 1, the seat locking release device 100 according to an embodiment of the present disclosure may include a left-right slide cable 110 that is connected to a left-right locking device 20 for fixing or releasing a left-right movement of a seat to apply a releasing force to the left-right locking device 20, a forward-backward slide cable 120 that is connected to a forward-backward locking device 10 for fixing or releasing a forward-backward movement of the seat to apply a releasing force to the forward-backward locking device 10, and an integrated locking release device 130 that simultaneously applies the releasing force to the left-right slide cable 110 and the forward-backward slide cable 120.

More specifically, the forward-backward locking device 10 may be installed on either one of a right side forward-backward rail R1-1 or a left side forward-backward rail R1-2 so that seats installed on the right side forward-backward rail R1-1 and the left side forward-backward rail R1-2 may slide or be fixed in the forward-backward direction.

In addition, the left-right locking device 20 may include a front left-right locking device 22 installed on the front left-right rail R2-2 and a rear left-right locking device 21 installed on the rear left-right rail R2-1 so that the seat installed on the front left-right rail R2-2 and the rear left-right rail R2-1 may slide or be fixed in the left-right direction.

In this case, the left-right slide cable 110 may include a front left-right slide cable 112 connected to the front left-right locking device 22 to apply a releasing force and a rear left-right slide cable 111 connected to the rear left-right locking device 21 to apply a releasing force. The front left-right slide cable 112 and the rear left-right slide cable 111 may be connected to each other within a cable box 113 to simultaneously receive a releasing force from an integrated left-right slide cable 114.

Hereinafter, the integrated locking release device 130 of the seat locking release device 100 according to an embodiment of the present disclosure will be described with reference to FIG. 2.

Figure 2:
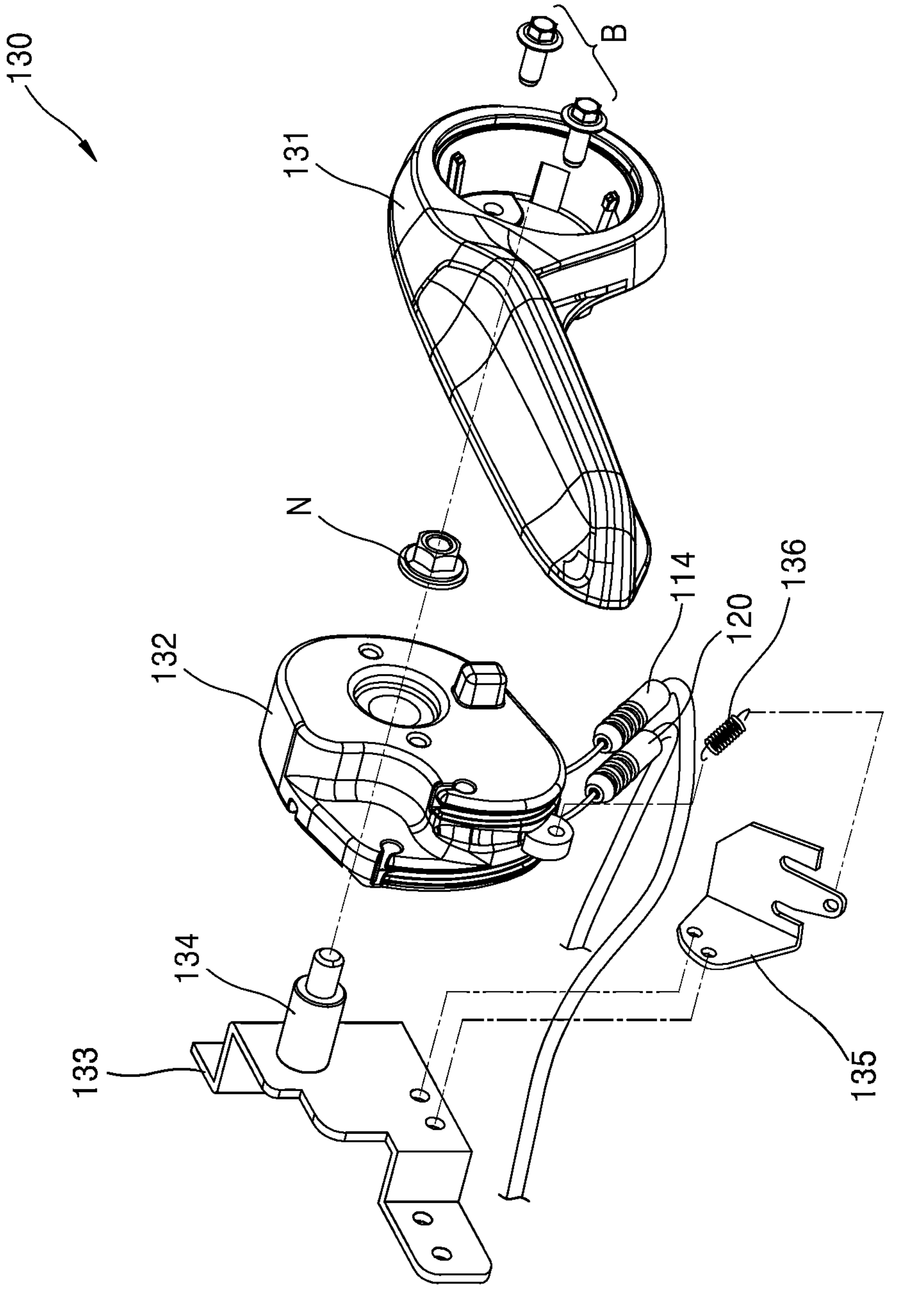
FIG. 2 is an exploded perspective view showing an integrated locking release device according to an embodiment of the present disclosure.

FIG. 2 is an exploded perspective view showing the integrated locking release device 130 according to an embodiment of the present disclosure. As shown in FIG. 2, the integrated locking release device 130 may include a lever 131, and a pulley 132 to which the left-right slide cable 114 and the forward-backward slide cable 120 are connected to rotate together with the lever 131.

More specifically, the pulley 132 may be rotatably installed on a first bracket 133 connected to one side of the seat and a pin 134 fixedly installed on the first bracket 133 by a nut N. In addition, a second bracket 135 may be installed at a lower portion of the first bracket 133, and a spring 136 may be installed between the pulley 132 and the second bracket 135. Therefore, the pulley 132 may rotate together with the lever 131 to apply the releasing force to the left-right slide cable 114 and the forward-backward slide cable 120 and then return to an original position by the spring 136.

Figure 3:
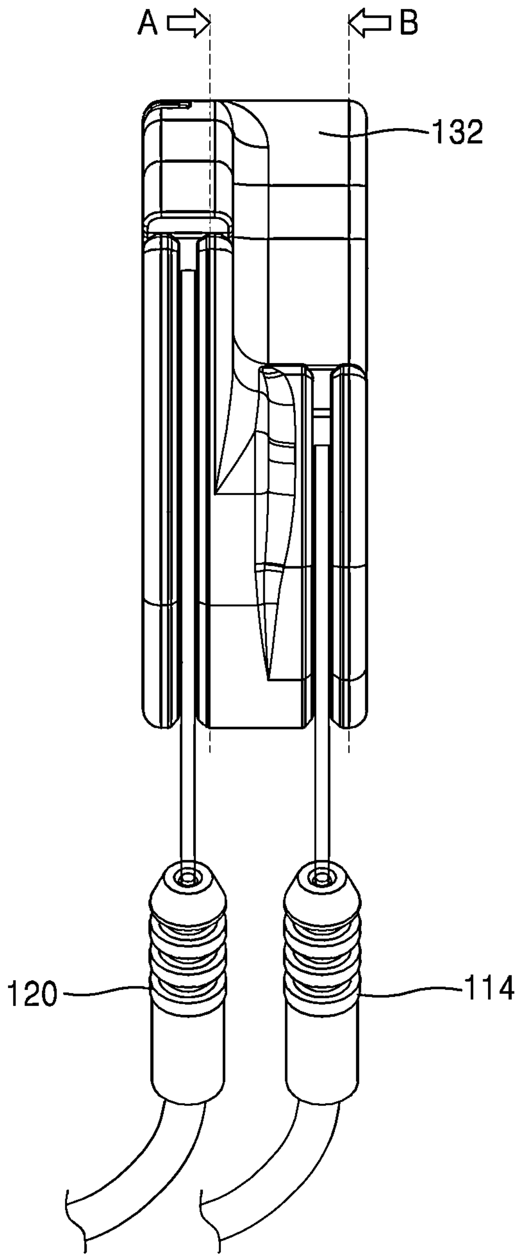
FIG. 3 is a side view showing a pulley according to an embodiment of the present disclosure when viewed from a side.
Figure 4:
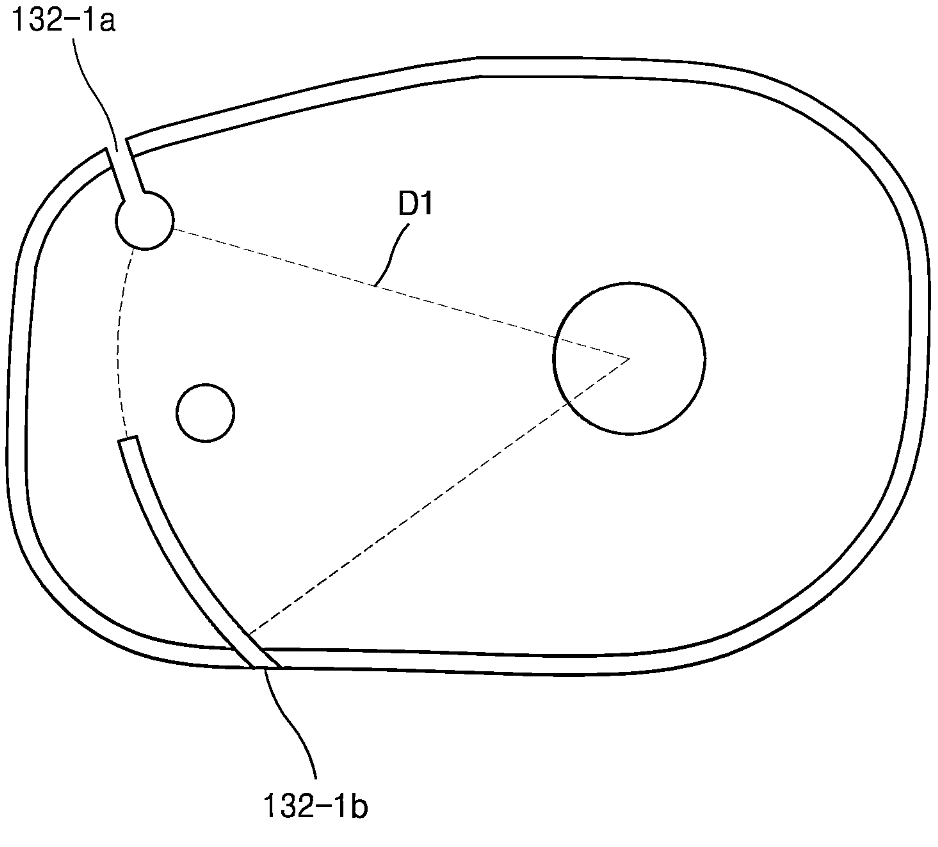
FIG. 4 is a cross-sectional view showing a cross-section A of the pulley shown in FIG. 3.
Figure 5:
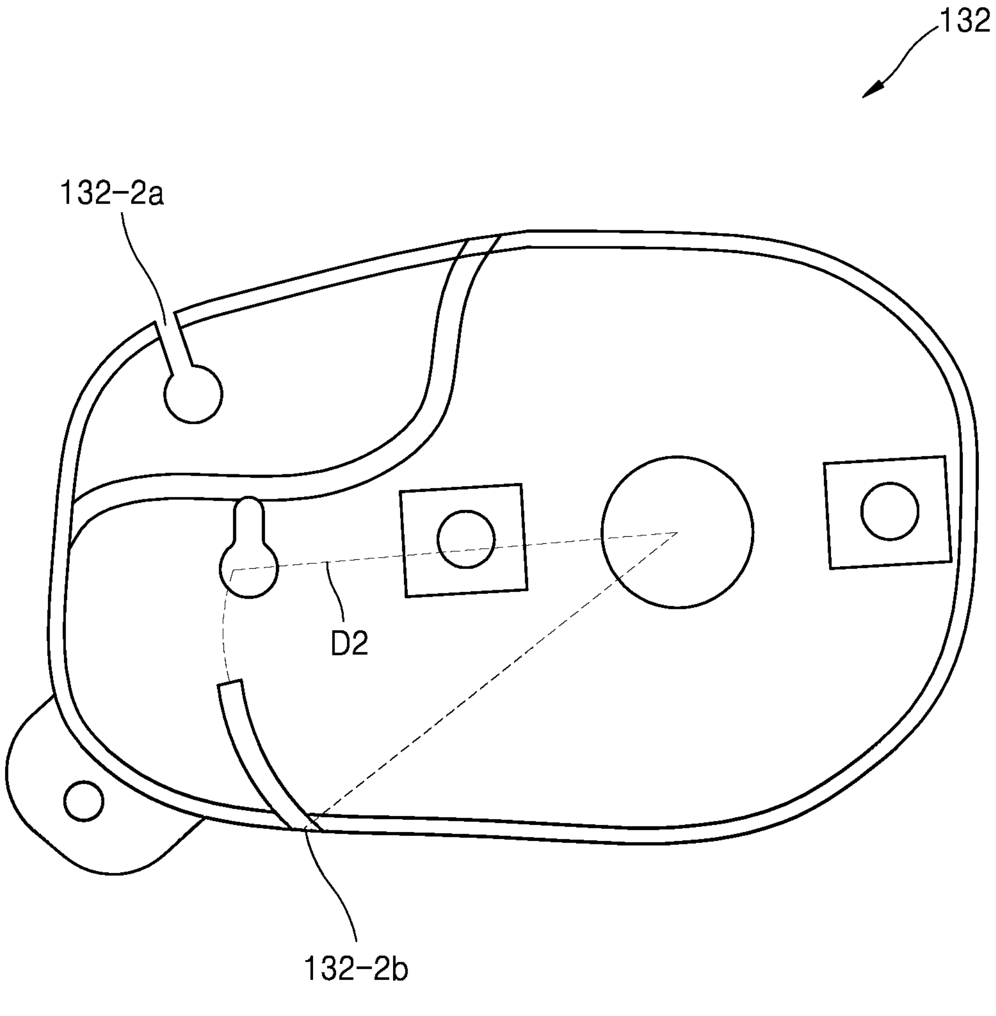
FIG. 5 is a cross-sectional view showing a cross-section B of the pulley shown in FIG. 3.

FIG. 3 is a side view showing the pulley 132 according to an embodiment of the present disclosure when viewed from a side, and FIGS. 4 and 5 are cross-sectional views showing a cross-section A and a cross-section B of the pulley 132 shown in FIG. 3.

First, as shown in FIG. 4, the pulley 132 may include a first fixing groove portion 132-1*a* formed to be spaced apart by a first radius D1 based on a rotating axis of the pulley 132 so that one end of the forward-backward slide cable 120 may be connected to the pulley 132 and a first guide portion 132-1*b* that is bent in a shape having a curvature corresponding to the first radius D1 so that the forward-backward slide cable 120 may extend or stretch while maintaining the first radius D1 according to a rotation of the pulley 132 to support or guide the left-right slide cable 120.

In addition, as shown in FIG. 5, the pulley 132 may include a second fixing groove portion 132-2*a* formed to be spaced apart by a second radius D2 based on the rotating axis of the pulley 132 so that one end of the left-right slide cable 114 may be connected to the pulley 132, and a second guide portion 132-2*b* that is bent in a shape having a curvature corresponding to the second radius D2 so that the left-right slide cable 114 may extend or stretch while maintaining the second radius D2 according to the rotation of the pulley 132 to support or guide the forward-backward slide cable 114.

Figure 6:
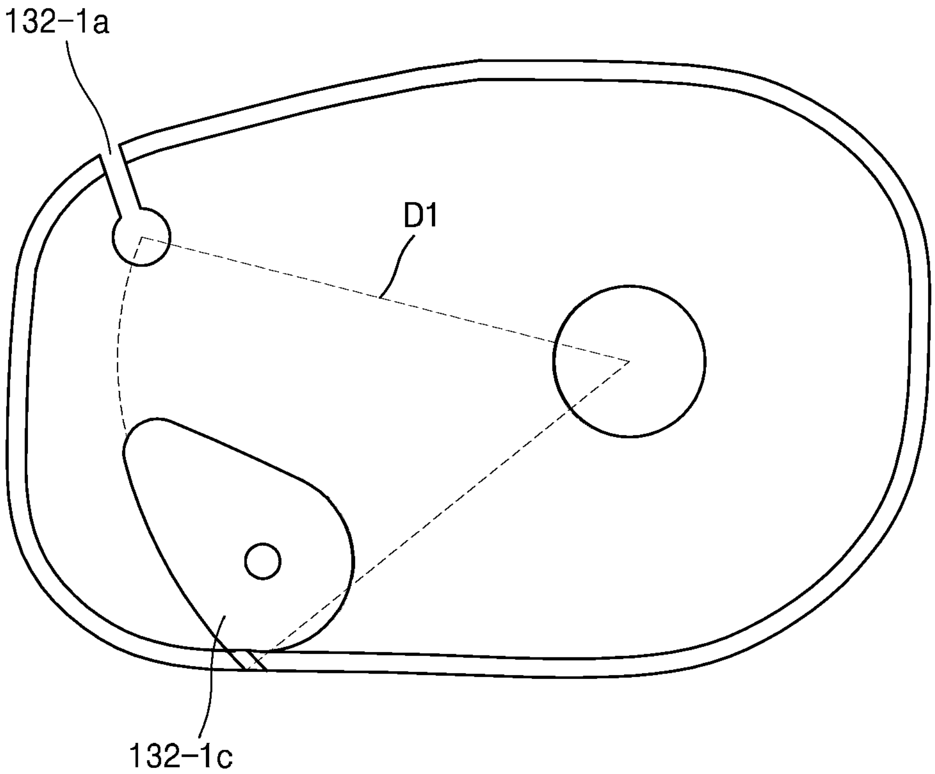
FIGS. 6 and 7 are cross-sectional views showing an operation of a stroke adjusting device according to an embodiment of the present disclosure.
Figure 7:
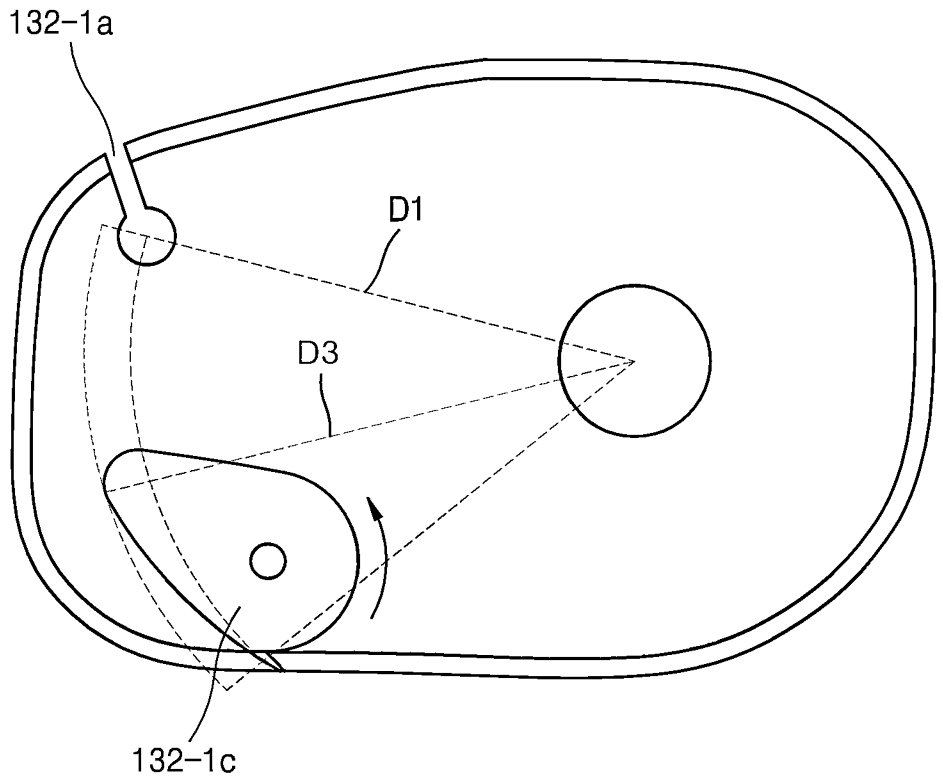

In addition, as shown in FIG. 6, the pulley 132 may include a stroke adjusting device 132-1*c* for adjusting a rotation radius of the left-right slide cable 120 or the forward-backward slide cable 120 so as to adjust a stroke amount by the rotation of the pulley 132. For example, as shown in FIG. 7, the stroke adjusting device 132-1*c* may be formed in a cam shape as a whole and may push out the left-right slide cable 120 or the forward-backward slide cable 120 so that the rotation radius of the cables becomes a third radius D3.

Therefore, a worker or a user may easily set a stroke amount for a releasing force required by a slide rail for installing a seat by using the stroke adjusting device 132-1*c*, and the stroke amount may be easily adjusted even when the cable stretches due to a long-term usage of the seat.

Figure 8:
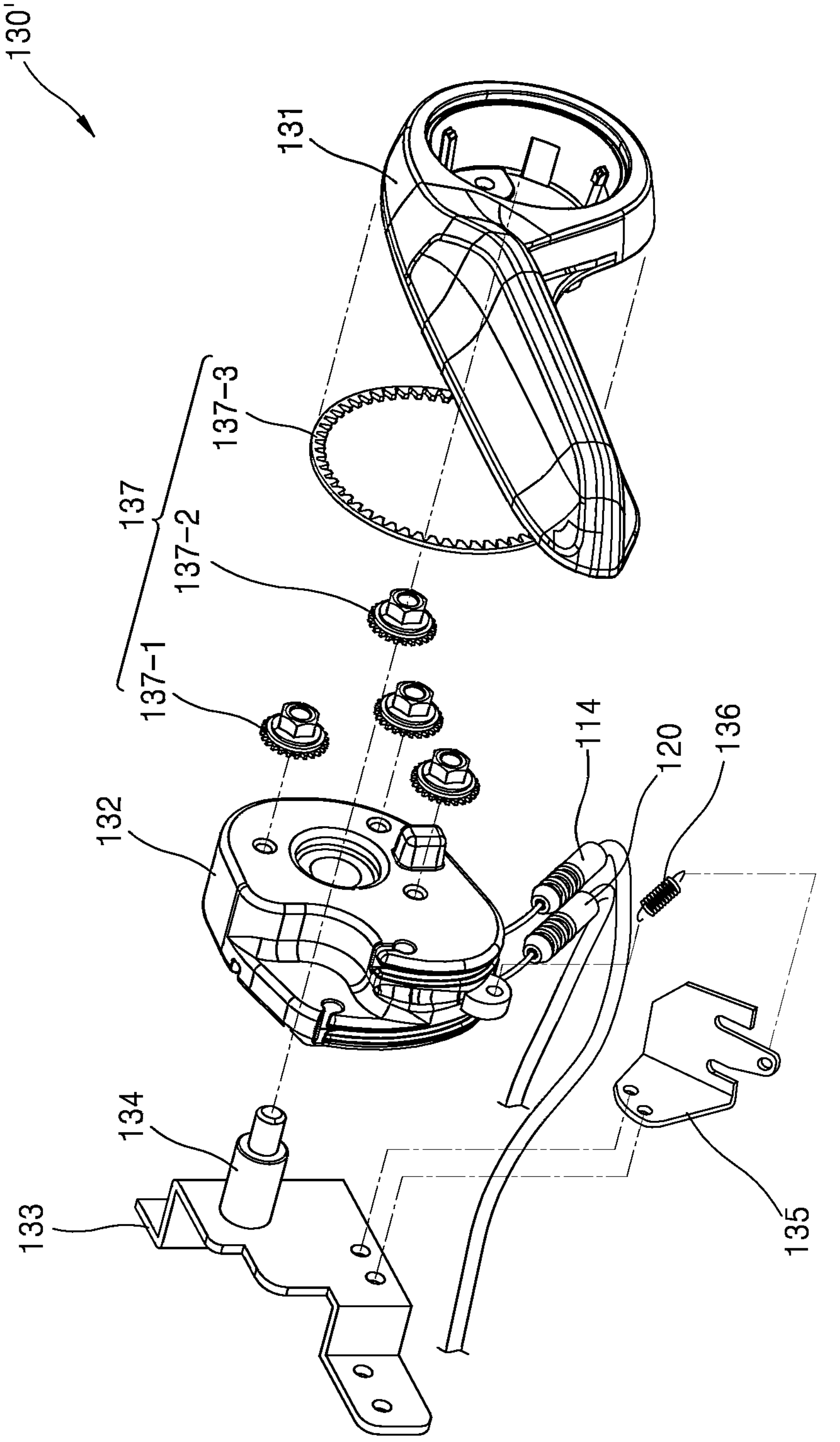
FIG. 8 is an exploded perspective view showing an integrated locking release device according to an embodiment of the present disclosure.

FIG. 8 is an exploded perspective view showing an integrated locking release device 130' according to another embodiment of the present disclosure. As shown in FIG. 8, the integrated locking release device 130' may include a planetary gear combination 137 installed between a pulley 132 and a lever 131 to increase a releasing force of the pulley 132 by decelerating a rotation of the lever 131.

More specifically, the planetary gear combination 137 may include a planetary gear 137-1 rotatably installed on the pulley 132, a sun gear 137-2 fixed on a pin 134, and a ring gear 137-3 fixed on the lever 131.

Therefore, since the front left-right slide cable 112 and the rear left-right slide cable 111 are connected, a large releasing force is required, the ring gear 137-3 rotates according to the rotation of the lever 131, and the pulley 132 is decelerated and rotates by the planetary gear 137-1 installed on the pulley 132, thereby securing a sufficient releasing force.

According to various embodiments of the present disclosure as described above, a user convenience can be improved by simultaneously releasing the left-right slide locking device and the forward-backward slide locking device, and there is an effect that a worker or a user can easily adjust the stroke amount of a cable for releasing the locking. However, the scope of the present disclosure is not limited by these effects.

Although the present disclosure has been described with reference to the embodiments illustrated in the drawings, these embodiments are merely illustrative and it should be understood by those skilled in the art that various modifications and equivalent other embodiments may be made therefrom. Therefore, the true technical protective scope of the present disclosure should be determined based on the technical spirit of the appended claims.

What is claimed is:

1. A seat locking release device comprising:

a left-right slide cable that is connected to a left-right locking device for fixing or releasing a left-right movement of a seat to apply a releasing force to the left-right locking device;

a forward-backward slide cable that is connected to a forward-backward locking device for fixing or releasing a forward-backward movement of the seat to apply a releasing force to the forward-backward locking device; and an integrated locking release device that simultaneously applies the releasing force to the left-right slide cable and the forward-backward slide cable.

2. The seat locking release device of claim 1, wherein the integrated locking release device includes a lever and a pulley to which the left-right slide cable and the forward-backward slide cable are connected, to rotate together with the lever.

3. The seat locking release device of claim 2, wherein the pulley includes a first fixing groove portion formed to be spaced apart by a first radius based on a rotating axis of the pulley so that the forward-backward slide cable is connected to the pulley, and a second fixing groove portion formed to be spaced apart by a second radius based on the rotating axis of the pulley so that the left-right slide cable is connected to the pulley.

4. The seat locking release device of claim 3, wherein the pulley includes a first guide portion that is bent in a shape having a curvature corresponding to the first radius so that the forward-backward slide cable extends or stretches while maintaining the first radius according to a rotation of the pulley to support or guide the forward-backward slide cable and a second guide portion that is bent in a shape having a curvature corresponding to the second radius so that the left-right slide cable extends or stretches while maintaining the second radius according to the rotation of the pulley to support or guide the left-right slide cable.

5. The seat locking release device of claim 3, wherein the first radius is formed to be greater than the second radius.

6. The seat locking release device of claim 3, wherein the integrated locking release device includes a stroke adjusting device for adjusting a rotation radius of the left-right slide cable or the forward-backward slide cable so as to adjust a stroke amount by the rotation of the pulley.

7. The seat locking release device of claim 6, wherein the stroke adjusting device is formed in a cam shape as a whole so as to be able to push out the left-right slide cable or the forward-backward slide cable.

8. The seat locking release device of claim 2, wherein the integrated locking release device further includes a planetary gear combination installed between the pulley and the lever to increase a releasing force of the pulley by decelerating a rotation of the lever.

9. The seat locking release device of claim 1, wherein the left-right locking device includes a front left-right locking device installed on a front left-right rail and a rear left-right locking device installed on a rear left-right rail, and the left-right slide cable includes a front left-right slide cable for applying a releasing force to the front left-right locking device, a rear left-right slide cable for applying a releasing force to the rear left-right locking device, a cable box for connecting the front left-right slide cable and the rear left-right slide cable, and an integrated left-right cable for applying the releasing force to the front left-right slide cable and the rear left-right slide cable simultaneously.

* * * * *